United States Patent [19]

Stähli

[11] 4,308,306

[45] Dec. 29, 1981

[54] FABRIC CONDITIONING PRODUCTS

[75] Inventor: Ernst Stähli, Olten, Switzerland

[73] Assignee: Lever Brothers Company, New York, N.Y.

[21] Appl. No.: 168,236

[22] Filed: Jul. 10, 1980

Related U.S. Application Data

[63] Continuation of Ser. No. 940,090, Sep. 6, 1978, abandoned.

[51] Int. Cl.³ .......... B32B 3/00

[52] U.S. Cl. .......... 428/141; 427/240; 427/271; 427/277; 427/288; 427/369; 427/394; 427/395; 427/396; 427/444; 427/9; 428/172; 428/220

[58] Field of Search .......... 427/246, 444, 369, 394–396, 427/271, 277, 275, 278, 288, 9; 428/213, 220, 141, 172

[56] References Cited

U.S. PATENT DOCUMENTS

| | | | |
|---|---|---|---|
| 4,070,520 | 1/1978 | Volz et al. | 427/244 |
| 4,086,387 | 4/1978 | Triolo | 427/244 |

*Primary Examiner*—Michael R. Lusignan
*Assistant Examiner*—Janyce A. Bell

[57] ABSTRACT

A sheet form fabric conditioner for use in a tumble dryer comprises a substrate carrying a fabric conditioning formulation exposed at the major surfaces of the sheet. The formulation forms a thin layer on each surface and the layers are embossed with channels. If these channels are visible after a drying cycle then sufficient conditioner remains for another cycle.

5 Claims, No Drawings

FABRIC CONDITIONING PRODUCTS

This is a continuation of application Ser. No. 940,090, filed Sept. 9, 1978, now abandoned.

This invention relates to fabric conditioning products intended for use with laundered fabrics in a tumble drying machine.

Products of this general class comprise an absorbent flexible substrate having a fabric conditioning formulation layer on at least one surface.

The products are used by being placed in a tumble dryer with laundered fabrics. The presence of water and heat in the dryer assists the transfer of conditioning formulation from the substrate to the fabrics as the latter and the substrate tumble together. Products of this class have been described in U.S. Pat. No. 3,442,692 (C. J. Gaiser) and U.S. Pat. No. 3,686,025 (D. R. Morton) the disclosures of which are incorporated herein by reference.

The substrate will preferably have absorbent properties so that some of the fabric conditioning formulation is within the substrate.

The substrate is of general sheet form intended to tumble with the laundered clothes in the dryer. The substrate may be of woven or non-woven fabric prepared from natural or synthetic fibres, for example cellulosic fibres. The substrate may have an integral form being prepared from a sheet of non-absorbent or absorbent polymeric material for example polyethylene or polyurethane respectively.

The dimensions of the substrate are not critical but commercial products will usually have side lenths of from about 12 cms to about 30 cms. The substrate thickness will be selected to provide the desired absorbency, flexibility and delivery characteristics.

The fabric conditioning formulation will contain a material able to provide a benefit on the dried fabric. This benefit will usually be fabric softening and materials providing this benefit are exemplified by Morton and are well characterised in the literature on fabric softening. Materials of this type will usually provide a reduction in static electricity retained on the fabric. Materials providing reduction in static without fabric softening may be present as a fabric conditioning material. The formulation may contain a perfume for deposition on the fabric during treatment.

The conditioning material may be present in admixture with a material assisting in formation of the product or delivery of the formulation. Thus to reduce the softening point of a conditioner, for example a softener, to the temperature range in which it transfers to fabrics in a tumble dryer an organic liquid, for example a long chain alcohol ethoxylated with from about 7 to about 9 moles of ethylene oxide, may be included in the formulation. The fabric conditioning composition preferably has a softening point in the range from about 35° C. to about 80° C.

A commercial product before use will have the formulation exposed on at least one surface, while after complete use the substrate will be seen. The difference between the formulation surface and substrate surface can be visually appreciated but differences in the appearance of the formulation surface during use cannot be seen. This non-appreciation of differences during use is of importance when only part of the formulation is used in a single wash cycle. A person desiring to re-use the product to obtain complete use of the formulation would not known if only a minor part of the formulation had been used or if a minor insufficient part remained for use in the next cycle.

This invention proposes a multiple use product configuration which gives the product user a guide to the amount of formulation remaining on the product after use.

A fabric conditioning product of the invention comprises a substrate of sheet form with a layer of a fabric conditioning formulation exposed on at least one major surface, characterised in that the layer has at least one area of reduced depth on its surface.

The area may be continuous, i.e. form an interconnected pattern, or discontinuous areas may be present. The area or areas will be visible to the user until the layer of formulation is used down to the level of the reduced depth area or areas. The area or areas may form a repeating pattern over the surface. The area or areas of reduced depth may form a brand name or a decorative design.

The area of reduced depth may extend down to the substrate surface. A product with an area of this type may be prepared by printing the formulation onto selected areas of the substrate leaving other areas uncovered. In this embodiment dissappearance of the reduced depth area indicates the product is effectively exhausted.

The area may extend to a depth in the formulation layer below which depth there is sufficient formulation to be effective in another treatment cycle. Therefore while the area of reduced depth is visible sufficient formulation remains for another cycle of use; in this embodiment also dissappearance of the reduced depth area indicates the product is exhausted.

Preferably the area of reduced depth is formed by indenting the formulation layer after the latter has been formed to a constant depth on the substrate.

The invention also relates to a multi-use fabric conditioning product wherein a product having a layer of fabric conditioning formulation on at least one surface of a substrate of sheet form is subjected to heat and/or pressure on at least one defined area of the layer of formulation to reduce the formulation depth within that area. Preferably the formulation is reduced to a level below which there is sufficient formulation for another cycle of use.

The amount of formulation in the level below the area of reduced depth is made sufficient to provide another cycle of use by empirically studying the amounts of formulation below the area of reduced depth with changes in the formulation and processing variables. Pressure may be used alone to form the area of reduced depth but it is preferably used together with the application of heat to soften the layer of formulation. The pressure will be exerted by a member and if a heated member is used the heating may be achieved by electrically heating the members. A preferred form of reduced depth areas is channels, i.e. elongate areas, which may form a pattern.

An example of a product and method for its manufacture will now be given.

An absorbent non-woven polyester substrate having a weight of about 30 g/m2 was used. The impregnation process was performed on a strip of substrate about 21.5 cm wide; this strip was subsequently perforated at intervals of about 28 cm so that sheets of 21.5 cm by 28 cm could be torn from a roll and used in a tumble dryer.

The strip was impregnated by passing it through a molten bath of a formulation comprising a commercially available dimethyl ditallow (hardened) ammonium chloride and C11–C15 secondary alcohol ethoxylated with 12 moles of ethylene oxide in the weight ratio of 75:25. An effective amount of perfume was also present in the bath. The formulation was absorbed within the substrate and also formed layers on the substrate surfaces. After the formulation layers had solidified the strip was compressed between a heated wire grill and a base plate to form a visible pattern of channels of reduced depth on the surface contacted by the wire grill.

An aligned pattern was formed on the formulation surface contacting the base plate by conduction of heat and pressure through the impregnated substrate. The channels on both surfaces extended down to the substrate.

A sheet was torn from the perforated strip and used in a tumble dryer with laundered textiles which were provided with a fabric softening benefit. After the treatment cycle the pattern was not visible; this showed there was not sufficient formulation available for another cycle.

The wire grill is preferably heated to a temperature just above the softening point of the formulation. Both sides of the strip may be subjected to a source of heat and pressure by the use of aligned grills or equivalent area forming means.

A suitable device for making the areas of reduced depth is an electrically heated metal rod covered with an insulating high melting point polymer. The rod or bar is movable towards a non-heated rod covered with rubber. The two rods are aligned so that an impregnated substrate placed between the rods is subjected to heat and pressure along a line when the rods are brought together. A device of this form is manufactured and sold by Bosch Limited.

Another device for forming the area of reduced depth is to have co-operating heated rollers between the nip of which is passed the impregnated substrate.

One or both of the rollers will carry on its surface a means for exerting pressure on the surface of the layer of formulation.

In the general application of this invention the areas of reduced depth will be a minor proportion of the surface area. The minimum surface area to allow the contrast to be appreciated may be about 5% of the total. The maximum proportion of the total surface having a reduced depth may be up to about 50%, preferably up to about 40% and more preferably up to about 30%.

I claim:

1. A fabric conditioning product for the conditioning of fabrics in a tumble dryer during the dryer cycle of a fabric laundering operation, said product comprising a substrate in flexible sheet form and a layer of fabric conditioning formulation on at least one major surface of the substrate, said layer having an exposed surface area and said layer including at least one region occupying between about 5% and about 50% of said exposed surface area, which region, before use of the product in a tumble dryer, has a reduced constant depth such that the layer presents a visually perceivable uneven surface of sharply defined configuration, said fabric conditioning formulation having a softening point of between about 35° C. and about 80° C.

2. A fabric conditioning product according to claim 1, wherein said region of reduced depth extends down to the substrate surface.

3. A fabric conditioning product according to claim 2 wherein said substrate is absorbent.

4. A process for manufacturing a fabric conditioning product, which process comprises the steps of:

(i) providing a substrate in flexible sheet form;

(ii) providing on at least one major surface of said substrate a layer of fabric conditioning formulation, said layer having an exposed area, and said fabric conditioning agent having a softening point between about 35° C. and 80° C.; and (iii) subjecting at least one region occupying between about 5% and about 50% of said exposed surface area, before use of the product in a tumble dryer, to heat to uniformly reduce the depth thereof such that the layer presents a visually uneven surface of sharply defined configuration.

5. A process for manufacturing a fabric conditioning product which comprises the steps of:

(i) providing a substrate in flexible sheet form;

(ii) providing on at least one major surface of said substrate a layer of fabric conditioning formulation, said layer having an exposed area, and said fabric conditioning agent having a softening point between about 35° C. and about 80° C.; and (iii) subjecting at least one region occupying between about 5% and about 50% of said exposed surface area, before use of the product in a tumble dryer, to pressure to uniformly reduce the depth thereof such that the layer presents a visually uneven surface of sharply defined configuration.

* * * * *

UNITED STATES PATENT AND TRADEMARK OFFICE

CERTIFICATE OF CORRECTION

PATENT NO. : 4,308,306

DATED : December 29, 1981

INVENTOR(S) : Ernst Stahli

It is certified that error appears in the above—identified patent and that said Letters Patent is hereby corrected as shown below:

Add the following to the first page, left column:

--[30] Foreign Application Priority Data
Sep. 6, 1977 [GB] United Kingdom 37152/77--

Signed and Sealed this

*Twenty-seventh* Day of *November 1984*

[SEAL]

*Attest:*

GERALD J. MOSSINGHOFF

*Attesting Officer* *Commissioner of Patents and Trademarks*

REEXAMINATION CERTIFICATE (547th)

United States Patent [19]

[11] B1 4,308,306

Stähli

[45] Certificate Issued Aug. 5, 1986

[54] FABRIC CONDITIONING PRODUCTS

[75] Inventor: Ernst Stähli, Olten, Switzerland

[73] Assignee: Lever Brothers Company, New York, N.Y.

Reexamination Request:
No. 90/000,699, Dec. 24, 1984

Reexamination Certificate for:

| | |
|---|---|
| Patent No.: | **4,308,306** |
| Issued: | **Dec. 29, 1981** |
| Appl. No.: | **168,236** |
| Filed: | **Jul. 10, 1980** |

Certificate of Correction issued Nov. 27, 1984.

Related U.S. Application Data

[63] Continuation of Ser. No. 940,090, Sep. 6, 1978, abandoned.

[51] Int. Cl.[4] .......................... B32B 3/00; D06N 7/04

[52] U.S. Cl. .................................... 428/141; 427/240; 427/271; 427/277; 427/288; 427/369; 427/394; 427/395; 427/396; 427/444; 427/9; 428/172; 428/220

[58] Field of Search .................. 427/240, 9, 271, 277, 427/288, 369, 394, 395, 396, 444; 428/141, 172, 220

[56] References Cited

U.S. PATENT DOCUMENTS 3,895,128 7/1975 Gaiser .................................. 428/43
4,113,630 9/1978 Hagner et al. ....................... 252/8.6

*Primary Examiner*—Michael R. Lusignan

[57] ABSTRACT

A sheet form fabric conditioner for use in a tumble dryer comprises a substrate carrying a fabric conditioning formulation exposed at the major surfaces of the sheet. The formulation forms a thin layer on each surface and the layers are embossed with channels. If these channels are visible after a drying cycle then sufficient conditioner remains for another cycle.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentabiity of claims 4 and 5 is confirmed.

Claim 2 is cancelled.

Claims 1 and 3 are determined to be patentable as amended.

New claims 6 and 7 are added and determined to be patentable.

1. A fabric conditioning product for the conditioning of fabrics in a tumble dryer during the dryer cycle of a fabric laundering operation, said product comprising a substrate in flexible sheet form *having two opposite faces* and a layer of fabric conditioning formulation [on] *completely covering* at least one major surface *of at least one face* of the substrate, said layer having an exposed surface area and said layer including at least one region occupying between about 5% and about 50% of said exposed surface area, which region, before use of the product in a tumble dryer, has a reduced constant depth such that the layer presents a visually perceivable uneven surface of sharply defined configuration, *which provides a guide to the amount of formulation remaining on the product after use,* said fabric conditioning formulation having a softening point of between about 35° C. and about 80° C.

3. A fabric conditioning product according to claim [2] *1,* wherein said substrate is absorbent.

*6. A fabric conditioning product according to claims 1 or 3 wherein said fabric conditioning formulation completely covers all of one or both of the opposite faces of said substrate.*

*7. A fabric conditioning product according to claim 1 or 3, wherein said region extends to a depth in the formulation layer below which depth there is a sufficient amount of formulation for the conditioning of fabrics in another dryer cycle.*

* * * * *